United States Patent [19]

Heitmann et al.

[11] Patent Number: 5,736,682
[45] Date of Patent: Apr. 7, 1998

[54] METHOD OF AND APPARATUS FOR ASCERTAINING THE MASS OF ROD-SHAPED ARTICLES OF THE TOBACCO PROCESSING INDUSTRY

[75] Inventors: Uwe Heitmann, Hamburg; Torsten Mörke, Dissau, both of Germany

[73] Assignee: Hauni Machinenbau AG, Hamburg, Germany

[21] Appl. No.: 620,598

[22] Filed: Mar. 22, 1996

[30] Foreign Application Priority Data

Apr. 7, 1995 [DE] Germany .......... 195 13 130.4
Nov. 29, 1995 [DE] Germany .......... 195 44 464.7

[51] Int. Cl.[6] .......... G01G 11/14; A24C 1/14
[52] U.S. Cl. .......... 177/16; 177/17; 177/119; 177/145; 222/55; 131/282
[58] Field of Search .......... 177/16, 17, 119, 177/145; 198/959, 572, 444; 222/55; 131/282

[56] References Cited

U.S. PATENT DOCUMENTS

| | | | |
|---|---|---|---|
| 2,091,516 | 8/1937 | Molins | 198/959 |
| 2,102,317 | 12/1937 | Gwinn | 198/959 |
| 3,626,953 | 12/1971 | Körber | |
| 3,974,007 | 8/1976 | Greve | |
| 4,418,773 | 12/1983 | Finet et al. | 177/16 |
| 4,969,551 | 11/1990 | Heitmann et al. | |
| 5,072,742 | 12/1991 | Heitmann | |
| 5,119,893 | 6/1992 | Jost | 177/16 |
| 5,472,078 | 12/1995 | Hoffmann et al. | 198/572 |
| 5,560,515 | 10/1996 | Dyett et al. | 177/145 |

FOREIGN PATENT DOCUMENTS

| | | |
|---|---|---|
| 1495752 | 12/1977 | United Kingdom |
| 2141245 | 12/1984 | United Kingdom |

*Primary Examiner*—Michael L. Gellner
*Assistant Examiner*—Randy W. Gibson
*Attorney, Agent, or Firm*—Darby & Darby

[57] ABSTRACT

The mass of rod-shaped articles of the tobacco processing industry is ascertained by advancing a multi-layer mass flow of plain or filter cigarettes or analogous rod-shaped articles of the tobacco processing industry over one or more stationary and/or mobile weighing devices which generate signals denoting the combined weight of articles in successive increments of the mass flow. Such signals are processed with signals denoting the numbers of articles in the respective increments and/or with signals denoting the speed of advancement of the mass flow to generate signals denoting the average mass of discrete articles in successive increments of the mass flow.

26 Claims, 5 Drawing Sheets

METHOD OF AND APPARATUS FOR ASCERTAINING THE MASS OF ROD-SHAPED ARTICLES OF THE TOBACCO PROCESSING INDUSTRY

BACKGROUND OF THE INVENTION

The present invention relates to improvements in methods of and in apparatus for ascertaining the mass of plain or filter tipped cigarettes, cigars, cigarillos or cheroots, of filter rod sections of unit length or multiple unit length and/or other rod-shaped articles of the tobacco processing industry. As used herein, the term "rod-shaped articles of the tobacco processing industry" is intended to denote, among others, those (such as cigarettes) which must be lighted so that the smoker can draw a column of tobacco smoke into her or his mouth, as well as those which are designed to merely supply hot air with admixed flavoring substances.

U.S. Pat. No. 3,626,953 discloses a mass determining procedure which involves introducing a certain number of cigarettes into a receptacle and weighing the thus obtained accumulation of cigarettes. Signals which denote the combined weight of the cigarettes in the receptacle are indicative of, or can be processed into, signals denoting the average weight of the cigarettes.

OBJECTS OF THE INVENTION

An object of the invention is to provide a novel and improved method of rapidly, reliably and accurately ascertaining the mass of rod-shaped articles of the tobacco processing industry.

Another object of the invention is to provide a method of reliably ascertaining the mass of large numbers of rod-shaped articles per unit of time.

A further object of the invention is to provide a method of ascertaining the mass of rod-shaped articles of the tobacco processing industry at the rate at which such articles are turned out and/or processed by a mass-producing or mass-processing machine or production line.

An additional object of the invention is to provide a novel and improved method of ascertaining the mass of plain or filter cigarettes and/or other rod-shaped articles of the tobacco processing industry in such a way that large numbers of articles can be tested per unit of time without affecting their appearance and/or other desirable characteristics.

Still other object of the invention is to provide a method which can furnish reliable results even though it need not be practiced by utilizing X-rays, beta rays and/or other types of radiation, the utilization of which necessitates the establishment of expensive undertakings in order to ensure the safety of the attendants.

A further object of the invention is to provide a method which is at least as reliable, at least as safe and at least as accurate as heretofore known methods even thought it can be resorted to for the determination of the masses of large quantities of rod-shaped articles per unit of time.

Another object of the invention is to provide a method which can be resorted to for the determination of the average mass of large numbers of rod-shaped articles of the tobacco processing industry and/or for the determination of the mass of individual rod-shaped articles.

An additional object of the invention is to provide a novel and improved apparatus for the practice of the above outlined method.

Still other object of the invention is to provide the apparatus with a novel and improved system for simultaneously weighing large quantities of rod-shaped articles per unit of time.

A further object of the invention is to provide the apparatus with a system for weighing each of a series of successive accumulations of rod-shaped articles only once or more than once.

Another object of the invention is to provide the above outlined apparatus with means for taking into consideration two or more different parameters which influence, or are likely to influence, the accuracy of determination of the mass of rod-shaped articles of the tobacco processing industry.

An additional object of the invention is to provide an apparatus which exhibits all of the above-enumerated advantages and can be incorporated into or combined with existing machines or production lines for the making and/or processing of rod-shaped articles of the tobacco processing industry.

SUMMARY OF THE INVENTION

One feature of the present invention resides in the provision of a method of ascertaining the mass of plain or filter cigarettes, cigars, cigarillos, cheroots, filter rod sections and/or other rod-shaped articles of the tobacco processing industry. The improved method comprises the steps of advancing a multi-layer mass flow of articles in a predetermined direction along a predetermined path, weighing at least once successive increments of the mass flow in at least one predetermined portion of the path, and generating a succession of signals denoting the weight of the respective increments of the mass flow and the mass of articles in the respective increments.

The weighing step can include weighing successive increments of the mass flow at least twice, and the signal generating step then comprises generating a succession of at least two signals each, with each succession of two signals each denoting the weight of the respective increments, and processing each succession of at least two signals each into signals denoting the combined mass of articles in the respective increments of the mass flow. The mass flow is often subject to the action of randomly developing forces which can influence the accuracy of the weighing and signal generating steps; therefore, the method can further comprise the step of at least reducing the influence of such forces upon the signal generating step. The weighing step is preferably carried out only in connection with articles in the at least one predetermined portion of the path, and such weighing step can include simultaneously weighing successive increments of the mass flow in the at least one predetermined portion of the path.

The mass flow contains a predetermined or preselected number of layers (e.g., three or five layers) of rod-shaped articles, at least during advancement of articles along the at least one predetermined portion of the path, and the method can further comprise the steps of monitoring the numbers of articles in successive increments of the mass flow and processing the signals as a function of the monitored numbers of articles in the respective increments.

The advancing step can include moving or advancing rod-shaped articles along the predetermined path at one of a plurality of different speeds, and the method can further comprise the steps of monitoring the numbers of articles in successive increments of the mass flow, generating first additional signals denoting the numbers of articles in the respective increments, measuring the speed of the articles in the predetermined path, generating second additional signals denoting the measured speed, and processing the signals of the aforementioned series together with the corresponding first and second additional signals into signals denoting the average mass of articles in the respective increments of the mass flow. Such method can further comprise the step of admitting rod-shaped articles into a second portion of the predetermined path upstream of the at least one predetermined portion, and the step of generating second additional signals can comprise counting the number of articles which are admitted into the second portion of the path per unit of time.

The weighing step can include that portion of the advancing step which involves advancing successive increments of the mass flow along the at least one predetermined portion of the path. Such weighing step can further include utilizing at least one conveyor type weigher (e.g., a scale known or adapted to be designated as a belt weigher).

It is also possible to select the advancing step in such a way that it involves pushing successive increments of the mass flow in the predetermined direction along the at least one predetermined portion of the path, and the weighing step of such method can include employing at least one stationary weighing device for successive increments of the mass flow.

Another feature of the present invention resides in the provision of an apparatus for ascertaining the mass of rod-shaped articles (such as plain or filter cigarettes, cigars, cigarillos, cheroots and/or filter rod sections of unit length or multiple unit length) of the tobacco processing industry. The improved apparatus comprises means for advancing a multilayer mass flow of rod-shaped articles in a predetermine direction along a predetermined path, and means for weighing successive increments of the mass flow in at least one predetermined portion of the path and for generating a succession of signals denoting the weight of successive increments and the mass of rod-shaped articles in the respective increments.

The weighing means can comprise at least one conveyor type weigher (e.g., a belt weigher) which forms part of the advancing means.

It is also possible to design the advancing means in such a way that it comprises means for pushing the rod-shaped articles of successive increments of the mass flow in the predetermined direction along the at least one predetermined portion of the path, and the weighing means of such apparatus can include at least one stationary weighing device for the articles in the at least one predetermined portion of the path.

The means for weighing can include a plurality of weighing devices for the rod-shaped articles in the at least one predetermined portion of the path, and each weighing device can include means for generating signals denoting the weight of successive increments of the mass flow. Such apparatus can further comprise means for processing signals from the plurality of weighing devices into signals denoting the mass of articles in the respective increments of the mass flow. One of the plurality of weighing devices can include at least one first balance beam extending substantially in the predetermined direction, and another or the other of the plurality of weighing devices can include at least one second balance beam extending substantially counter to the predetermined direction. The balance beams can constitute carriers for successive increments of the mass flow in the at least one predetermined portion of the path. The advancing means can include a surface which supports the bottom layer of the articles forming the mass flow in the predetermined path; the one weighing device and the other weighing device can define pivot axes for the respective balance beams, and such pivot axes preferably extend transversely of the predetermined direction and are preferably at least close to the surface of the advancing means. The first and second balance beams can at least partially overlap each other, as seen in the predetermined direction, and the one as well as the other weighing device can further comprise means for supporting the respective balance beams in overhung positions for pivotal movement about axes which extend transversely of the predetermined direction. At least the apparatus with at least two weighing devices can further comprise means for counting the articles in successive increments of the mass flow and for generating additional signals denoting the numbers of articles in the respective increments of the mass flow, and such apparatus can further comprise means for processing the additional signals together with the corresponding signals from the plurality of weighing devices.

Irrespective of the number of weighing devices, the apparatus can be provided with means for counting the articles in successive increments of the mass flow and for generating additional signals which denote the number of articles in the respective increments of the mass flow. Such apparatus can also comprise means for processing the signals of the aforementioned sequence or succession of signals (i.e., those denoting the weights of successive increments of the mass flow) and the corresponding additional signals. This apparatus can also comprise means for admitting or feeding rod-shaped articles into a second portion of the predetermined path upstream of the at least one predetermined portion, and the article counting means of such apparatus can comprise means for counting the number of articles which are admitted into the second portion of the path per unit of time.

Irrespective of the number of weighing devices, the advancing means of the improved apparatus can comprise means for advancing the mass flow of rod-shaped articles at a selected one of a plurality of different speeds, and the apparatus can further comprise means for feeding or admitting rod-shaped articles into a second portion of the path upstream of the at least one predetermined portion, means for generating first additional signals denoting the number of articles which are admitted into the second portion of the path per unit of time, means for generating second additional signals which denote the selected speed of the mass flow, and means for processing the first additional signals with the second additional signals and the corresponding signals of the succession of signals into signals which denote the average mass of discrete articles in the respective increments of the mass flow. If the means for weighing comprises a plurality of weighing devices for the rod-shaped articles in the at least one predetermined portion of the path, each such weighing device can comprise means for transmitting to the processing means signals denoting the weight of the respective increments of the mass flow.

The novel features which are considered as characteristic of the invention are set forth in particular in the appended claims. The improved method and apparatus themselves, however, both as to their steps and their constituents, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
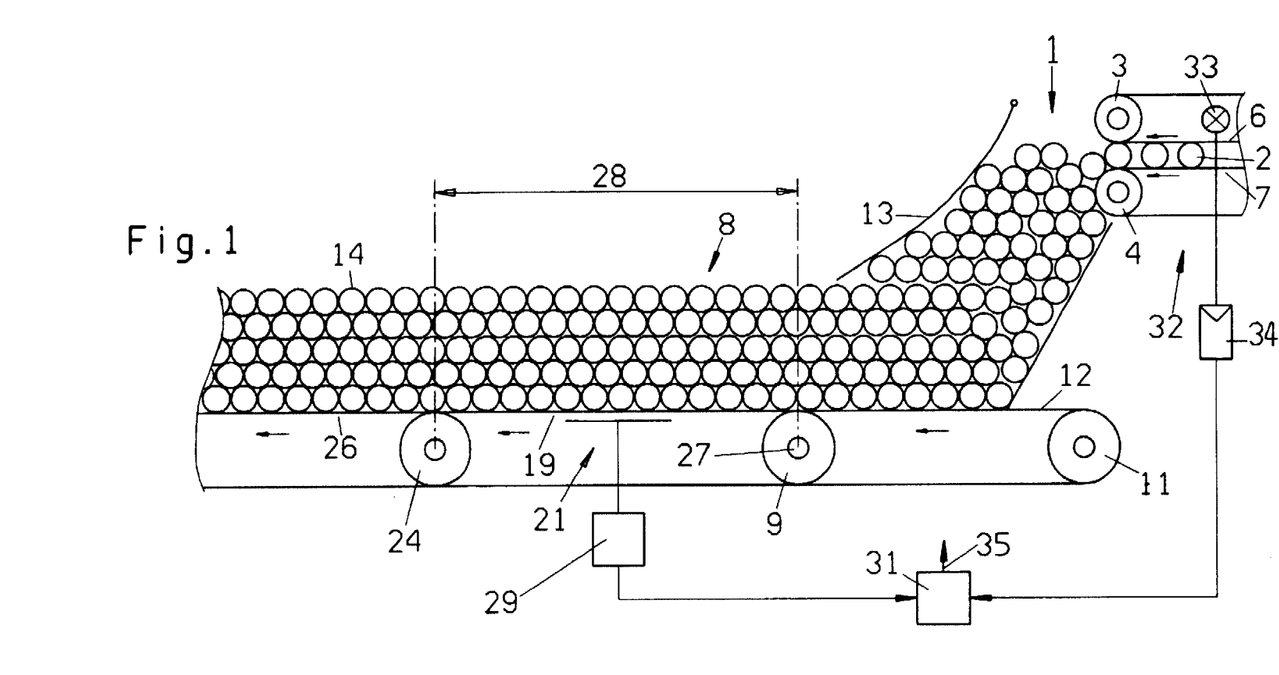
FIG. 1a is a schematic side elevational view of an apparatus which employs a single mobile weighing device.

FIG. 1 shows a mass flow 8 of parallel rod-shaped articles 2 of the tobacco processing industry, e.g., plain or filter cigarettes. The mass flow 8 which is shown in FIG. 1 comprises five superimposed layers 14 of parallel rod-shaped articles 2 (hereinafter called cigarettes for short but with the understanding that the apparatus of the present invention can be employed with equal or similar advantage for the ascertainment of the mass of many if not all other rod-shaped articles of the tobacco processing industry). The mass flow 8 is formed at a zone or station 1 and is caused to advance along an elongated substantially horizontal path in a direction to the left, as viewed in FIG. 1.

Figure 2:
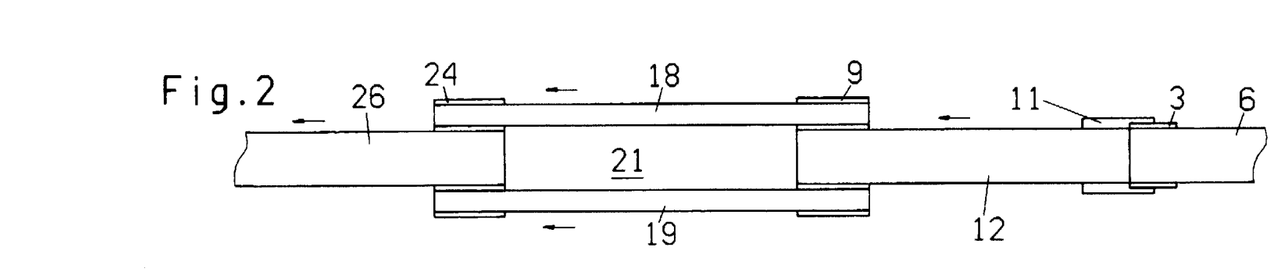
FIG. 2 is a schematic plan view of certain parts of the apparatus of FIG. 1, with the rod-shaped articles omitted.

The means for admitting or feeding a single layer of discrete cigarettes 2 to the mass flow forming zone 1 comprises two endless belt or chain conveyors 6, 7 which are respectively trained over sets of pulleys or sheaves 3 and 4 (only one pulley 3 is shown in FIGS. 1 and 2, and only one pulley 4 is shown in FIG. 1).

The reference character 13 denotes an apron or an analogous pivotably or similarly mounted deformable device which overlies and stabilizes the uppermost layer 14 of cigarettes 2 at the mass flow forming zone 1.

The means for advancing the mass flow 8 in the predetermined direction includes a first belt or band conveyor 12 which is trained over pulleys or sheaves 9, 11. At least one of these pulleys is driven to ensure that the upper reach of the belt conveyor 12 advances the lowermost layer 14 of the mass flow 8 in a direction to the left, i.e., away from the mass flow forming zone 1. The cigarettes 2 in the mass flow 8 are in a so-called quincunx formation, and their longitudinal axes are horizontal and parallel to each other and extend transversely of the direction of advancement of the mass flow, e.g., from a cigarette maker (including or delivering cigarettes 2 to the endless belts 6, 7) toward a filter tipping machine wherein plain cigarettes are assembled with filter rod sections to form filter cigarettes of unit length or multiple unit length. The number of layers 14 in the mass flow 8 can be more or less than five. Successive identical increments of a properly built mass flow 8 normally contain identical numbers of cigarettes 2, even immediately downstream of the mass flow forming or building zone 1.

The means for advancing the mass flow 8 further comprises two endless belt conveyors 18, 19 which receive successive increments of the mass flow 8 from the upper reach or stretch of the conveyor 12, as well as a belt conveyor 26 having an upper reach which receives successive increments of the mass flow 8 from the upper reaches of the conveyors 18, 19. The conveyors 18, 19 are trained over the pulley 9 for the conveyor 12 as well as over a pulley 24. The conveyor 26 is also trained over the pulley 24 as well as over at least one additional pulley, not shown. The manner in which at least one pulley for each of the four conveyors 12, 18, 19, 26 is driven to advance the mass flow 8 at a single speed or at one of a plurality of different speeds is not shown in FIGS. 1 and 2.

The upper surfaces of the upper reaches of the conveyors 12, 18, 19, 26 jointly define a composite supporting surface for the lowermost layer 14 of the mass flow 8 from the building or forming zone 1 toward the first processing station for the cigarettes 2 of the mass flow 8 or toward storage. The weight of that one of successive increments of the mass flow 8 which is disposed in a predetermined portion (indicated in FIG. 1, as at 28) of the path for the mass flow causes the upper reaches of the flexible conveyors 18, 19 to yield in that the right-hand halves of these conveyors pivot about the axis of a horizontal shaft 27 for the pulley 9. The extent of such pivoting of the right-hand halves of the upper reaches of the conveyors 18, 19 is indicative of the weight of that increment of the mass flow 8 which happens to be located in the predetermined portion 28 of the path for the mass flow 8, and such pivoting is ascertained by the signal generating component 29 of a weighing system or device 21. The latter can be said to constitute a so-called conveyor type weigher or belt weigher which further includes the belt conveyors 18 and 19. The output of the signal generating component 29 of the weighing device 21 transmits signals (denoting the weight of successive increments of the mass flow 8 (if necessary subsequent to appropriate amplification) to the corresponding input of a suitable signal processing circuit 31. The latter can constitute or include or form part of a suitable computer and is provided with a second input for signals from a cigarette counter 32 shown in FIG. 1 as being adjacent the path for individual or discrete cigarettes 2 between the confronting reaches of the belt conveyors 6, 7 of the means for feeding cigarettes 2 into the mass flow forming or building zone 1.

The illustrated counter 32 comprises a radiation source 33 (e.g., a light emitting diode) and a photoelectronic transducer 34 which transmits a signal to the second input of the signal processing circuit 31 whenever it detects that a cigarette 2 between the conveyors 6, 7 has interrupted the light beam issuing from the radiation source 33 and being directed toward the transducer 34. The purpose of the counter 32 is to transmit to the circuit 31 signals which can be utilized to monitor the number of cigarettes 2 in successive increments of the mass flow 8. The length of each such increment corresponds to the length of the predetermined portion 28 of the path for the mass flow 8, i.e., to the effective length of the weighing device 21 (as seen in the direction of advancement of the mass flow 8 away from the zone 1). The zone 1 can be said to constitute a second portion of the path for the mass flow 8, and such second portion is located upstream of the portion 28.

The circuit 31 processes the signals which are supplied by the signal generating component 29 of the weighing device 21 and denote the weight of successively weighed increments of the mass flow 8, as well as the signals supplied by the transducer 34 and denoting the number of cigarettes 2 in each of a succession or series of increments of the mass flow 8 to generate electric signals (indicated in FIG. 1 by the arrow 35) which denote or can denote the average mass of each of the large or relatively large number of cigarettes 2 in the respective increment of the mass flow 8.

If the number of cigarettes 2 in each of a short or long series of successive increments of the mass flow 8 is the same or practically the same, the signal denoted by the arrow 35 need merely indicate the average weight of a cigarette 2 in each of a series of successively weighed increments.

Signals denoted by the arrow 35 can be utilized to display the results of the weighing and counting operations, or to influence the operation of the machine(s) or machine portion(s) controlling the mass of the cigarettes 2. For example, signals denoted by the arrow 35 can be utilized in a cigarette rod making machine to influence the mass of tobacco particles per unit length of a so-called (rod-like) tobacco filler which is thereupon draped into cigarette paper or other suitable wrapping material and is subdivided into plain cigarettes, cigars, cigarillos or cheroots of unit length or multiple unit length. The mass of tobacco particles in the aforementioned rod-like tobacco filler can be influenced by reducing the rate of admission of tobacco particles in a stream which is conveyed to the rod-building zone of a distributor or hopper in a cigarette maker and/or by changing the rate of removal of surplus tobacco from successive increments of a freshly formed unequalized tobacco stream or rod.

If the apparatus of FIG. 1 is to be used in or in conjunction with a machine for the making of filter rod sections which are to be assembled with plain cigarettes, cigars, cigarillos or cheroots into filter cigarettes or the like, the articles 2 are filter rod sections of unit length or multiple unit length and the signals denoted by the arrow 35 can be used to control the rate at which a filter tow advances from a source (such as a bale) to a wrapping station where the tow is draped into imitation cork or other suitable wrapping material to form therewith a continuous filter rod which is ready to be subdivided into filter rod sections of unit length or multiple unit length.

The manner in which a machine can turn out plain cigarettes is disclosed, for example, in commonly owned U.S. Pat. No. 5,072,742 granted to Uwe Heitmann. The manner in which a machine can turn out filter cigarettes is disclosed, for example, in commonly owned U.S. Pat. No. 4,969,551 to Heitmann et al., and the manner in which a machine can turn out filter rod sections is disclosed, for example, in U.S. Pat. No. 3,974,007 to Greve. The disclosures of these patents are incorporated herein by reference. A filter cigarette production line (manufactured and distributed by the assignee of the present application) which embodies a cigarette maker and a filter tipping machine is known as PROTOS 2, and a filter rod production line (also manufactured and distributed by the assignee of the present application) is known as AF 3E/KDF 3E.

Figure 3:
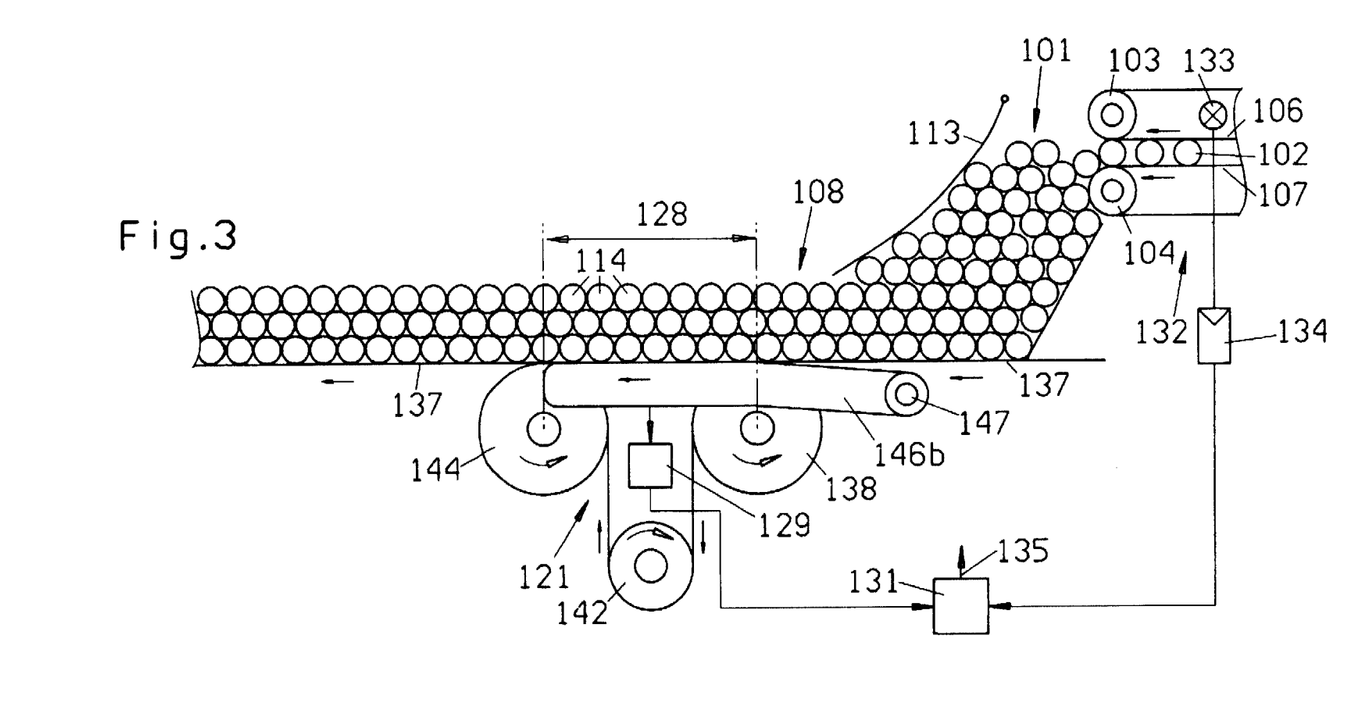
FIG. 3 is a view similar to that of FIG. 1 but showing a portion of a modified apparatus with a single stationary weighing device.
Figure 4:
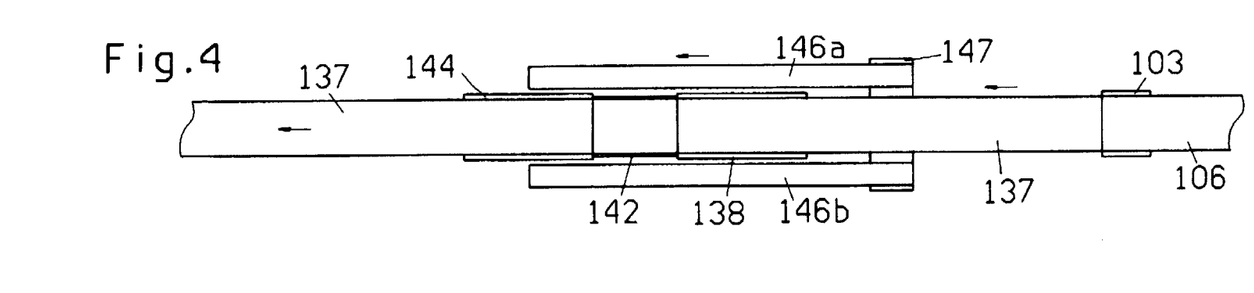
FIG. 4 is a plan view of certain parts of the apparatus of FIG. 3, with the rod-shaped articles omitted.

All such parts of the apparatus of FIGS. 3 and 4 which are identical with or clearly analogous to the corresponding parts of the apparatus of FIGS. 1 and 2 are denoted by similar reference characters plus 100. The conveyor type weighing device 21 of FIGS. 1-2 is replaced with a single stationary weighing device 121 which operates between two longitudinally spaced apart portions of the upper reach of a belt conveyor 137 replacing the conveyors 12 and 26. The right-hand portion of the upper reach of the belt conveyor 137 is located at a level beneath the zone or station 101 for the building or formation of a mass flow 108 of cigarettes 102. The mass flow 108 of FIG. 3 comprises only three superimposed layers 114 of cigarettes 102. The upper reach of the belt conveyor 137 is trained over a pulley or sheave 138 at the receiving or inlet end of the predetermined portion 128 of the path for the mass flow 108, thereupon about a pulley 142 at a level beneath the median part of the path portion 128, and thereafter over a pulley or sheave 144 causing the left-hand portion of the upper reach of the belt conveyor 137 to advance at the level of the right-hand portion of the upper reach of 137. The directions of rotation of the pulleys 138, 142, 144 and of the two portions of the upper reach of the conveyor 137 are indicated by arrows.

The weighing device 121 comprises two beams 146a, 146b which extend in the direction of advancement of the mass flow 108 and are mounted for slight pivotal movement about a horizontal axis defined by a shaft 147 and extending transversely of the direction of advancement of the mass flow 108. The level of the axis of the shaft 147 is close to but below the level of the upper surfaces of the two portions of the upper reach of the conveyor 137, and the upper sides of the beams 146a, 146b are located at or immediately adjacent such upper surfaces.

The weight of cigarettes 102 filling the predetermined portion 128 of the path for the mass flow 108 acts upon and tends to pivot the beams 146a, 146b in a counterclockwise direction, as viewed in FIG. 3. Such pivotal movement of the beams 146a, 146b, or the force exerted by these beams under the weight of the cigarettes 102 in the path portion 128, causes the signal generating component 129 of the weighing device 121 to transmit a corresponding signal to the respective input of the signal processing circuit 131. Another input of the circuit 131 receives signals from a cigarette counter 132 which performs the same function as the counter 32. Thus, the radiation source 133 and the photoelectronic transducer 134 of the counter 132 cooperate to transmit to the circuit 131 signals denoting the feeding of successive cigarettes 102 (by the endless belt conveyors 106, 107 respectively trained over pulleys 103, 104) into the zone 101 for the formation or building of the filler stream 108 at the apron 113.

The output 135 of the signal processing circuit 131 (e.g., a suitable computer) transmits signals which are indicative of the weight/mass of successive increments of the mass flow 108. The signals transmitted by the output 135 can also denote the average mass of discrete cigarettes 102 in successive increments of the mass flow 108.

The weighing device 121 is preferably designed in such a way that the pivotal movements of its beams 146a, 146b are negligible or nil, i.e., the device 121 can be said to constitute a stationary weighing device or apparatus.

FIG. 3 shows that the right-hand portion of the upper reach of the belt conveyor 137 serves as a means for pushing cigarettes 102 of successive increments of the mass flow 108 toward and along the upper sides of the beams 146a, 146b, i.e., toward and onto the left-hand portion of the upper reach of the belt conveyor 137.

Figure 5:
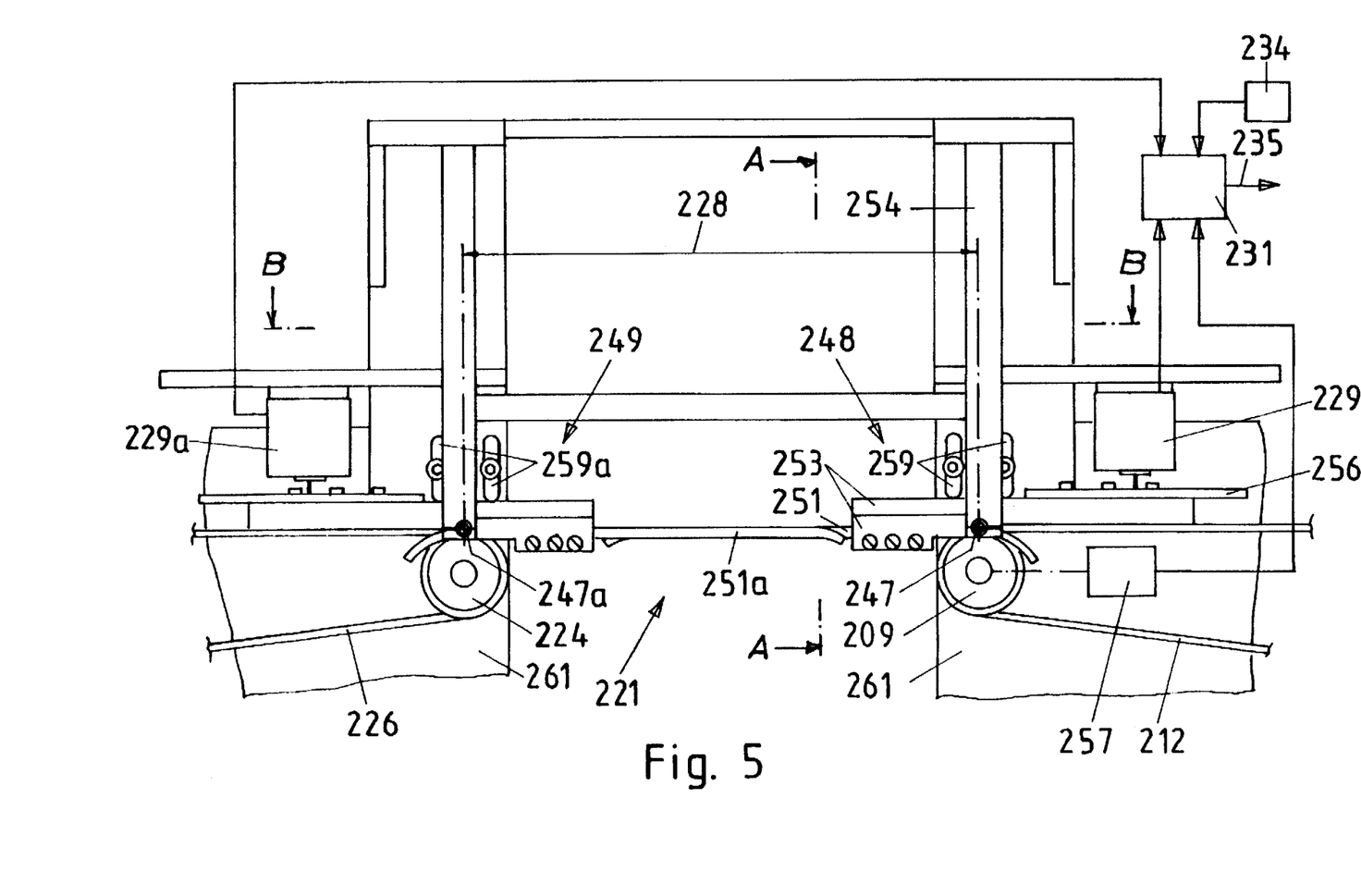
FIG. 5 is a fragmentary schematic side elevational view of a third apparatus which employs two substantially mirror symmetrical weighing devices.
Figure 6:
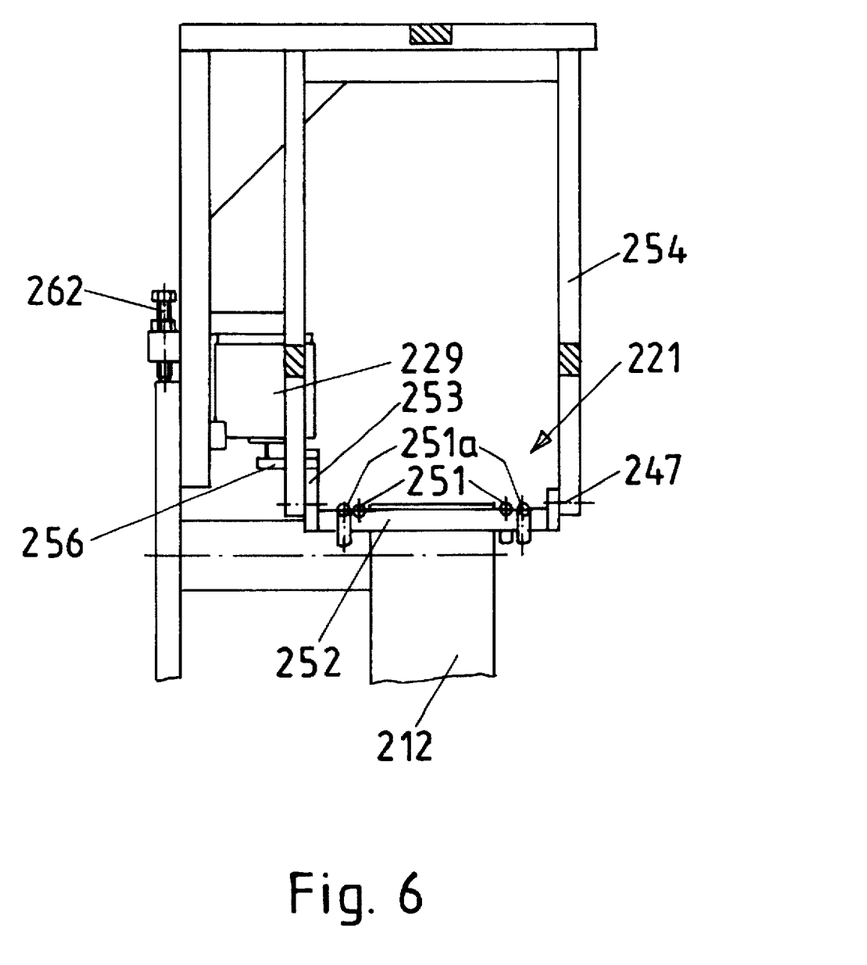
FIG. 6 is a fragmentary vertical sectional view substantially as seen in the direction of arrows from the line A—A in FIG. 5.
Figure 7:
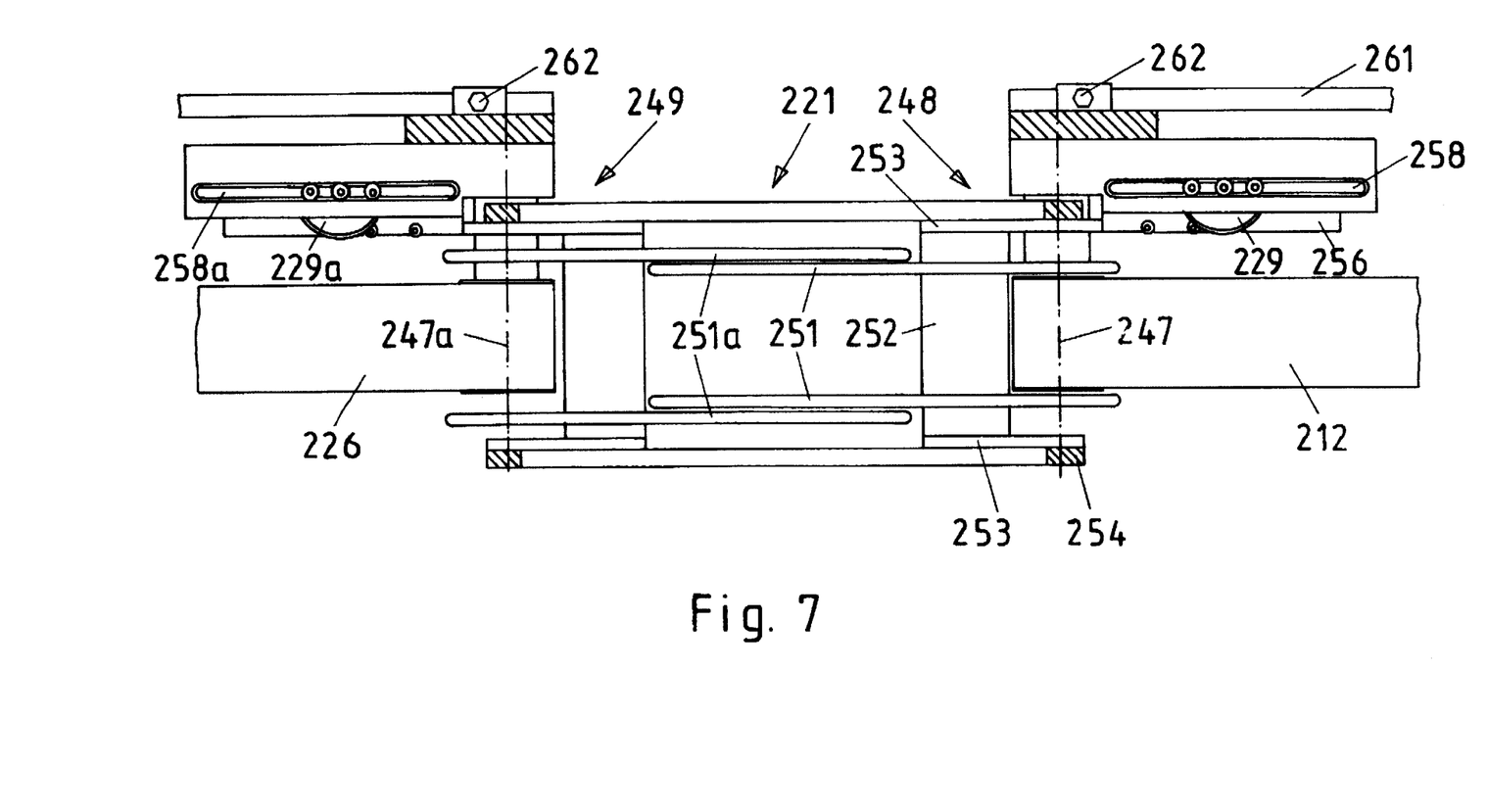
FIG. 7 is a fragmentary horizontal sectional view substantially as seen in the direction of arrows from the line B—B in FIG. 5.

FIGS. 5 to 7 illustrate certain details of a third mass ascertaining apparatus wherein all such parts which are identical with or clearly analogous to those shown in FIGS. 1 and 2 are denoted by similar reference characters plus 200. The structure of FIGS. 5 to 7 constitutes a presently preferred embodiment of the improved mass ascertaining apparatus and its weighing means 221 utilizes two discrete weighing devices 248, 249 which are substantial mirror images of each other with reference to a vertical plane disposed substantially midway between the pulleys or sheaves 209, 224 for the endless flexible belt conveyors 212, 226 forming part of means for advancing a mass flow (not shown) corresponding to the mass flow 8 or 108 and consisting of rod-shaped articles (e.g., plain or filter cigarettes) of the tobacco processing industry.

The weighing means 221 operates between the belt conveyors 212, 226 of the advancing means. The zone or station for the building of a continuous multi-layer mass flow of rod-shaped articles advancing first with the conveyor 212, thereupon in the path portion 228, and thereafter with the conveyor 226 is not shown in FIGS. 5 to 7 because such zone can be identical to those (1 and 101) described with reference to FIG. 1 and FIG. 3.

The weighing device 248 of the weighing means 221 comprises two spaced apart parallel carriers or beams 251

(see particularly FIG. 7) which extend in the direction of advancement of the mass flow in the path portion 228, and the weighing device 249 has two carriers or beams 251a which extend counter to such direction, namely from the upper reach of the conveyor 226 toward the upper reach of the conveyor 212. The beams 251 partially overlap the beams 251a, as seen in the direction of advancement of the mass flow from the conveyor 212, along the path portion 228, and thereupon with the conveyor 226. For example, the beams can overlap through a distance of 50 millimeters or more.

At least those portions of the beams or carriers 251, 251a which are actually contacted by the rod-shaped articles of the lowermost layer of the increment of mass flow in the path portion 228 can be made of small-diameter tubular stock to reduce friction with the adjacent articles and to reduce the likelihood of a pileup or misalignment of such articles in the path portion 228. Still further, the surfaces of those portions of the beams 251, 251a which are actually contacted by the adjacent rod-shaped articles can be finished, coated and/or otherwise treated to even further reduce friction with the adjacent rod-shaped articles which are being pushed by the upper reach of the conveyor 212 to advance toward and onto the upper reach of the conveyor 226. Still further, it is possible to provide the beams 251, 251a of the two weighing devices 248, 249 with narrow elongated belts or bands which are driven or which receive motion from the adjacent (moving) rod-shaped articles; this even further reduces the likelihood of excessive interference with the advancement of rod-shaped articles from the conveyor 212 toward and onto the conveyor 226 but contributes to the cost of the weighing devices 248, 249.

Since the weighing devices 248, 249 are or can be identical with each other, the following part of the description of the apparatus of FIGS. 5 to 7 will merely deal with the construction and mode of operation of the weighing device 248. The corresponding parts of the weighing device 249 are denoted by similar reference characters plus "a".

The beams 251 of the weighing device 248 are mounted on a support 252 in the form of a crossbeam extending transversely of the direction of advancement of the mass flow and being mounted on a linkage 253. The parts 252, 253 enable the beams 251 to pivot to a desired extent about a horizontal axis 247 which extends transversely of the direction of advancement of the mass flow and is located at the level of the upper sides or surfaces of the upper reaches of the conveyors 212, 226, i.e., at the level of surfaces which support the lowermost layer of the multi-layer mass flow of rod-shaped articles advancing toward, through and beyond the path portion 228. The support 252 and the linkage 253 are mounted in a frame or housing 254. An advantage of the just described positioning of the level of the axis 247 is that friction which develops between the advancing mass flow of rod-shaped articles and the stationary beams 251 of the weighing device 248 does not entail the development of a moment which would tend to pivot the beams 251 about the axis 247 and could adversely influence the accuracy of weighing of successive increments of the mass flow by the weighing device 248.

The linkage 253 serves to transmit pressure of rod-shaped articles in successive increments of the mass flow to a signal generating component 229 of the weighing device 248 by way of a contact plate 256 which is carried by the linkage 253. Signals which are transmitted by the output of the signal generating component 229 of the weighing device 248 are indicative of the weight of successive increments of the mass flow in the path portion 228 above the beams 251.

The signal generating component 229 is mounted in or on the frame 254, and its signal transmitting output is electrically connected with the corresponding input of a signal processing circuit 231.

The carriers or beams 251 of the weighing device 248, the support 252, the linkage 253 and the contact plate 256 constitute a rigid assembly which is pivotable about the axis 247 to transmit the weight of successive increments of the mass flow on the beams 251 to the signal transmitting component 229 of the weighing device 248. It is preferred to design the device 248 in such a way that the extent of pivotal movement of the aforementioned rigid assembly about the axis 247 is minimal or negligible; this is desirable and advantageous because excessive pivoting of the beams 251 about the axis 247 could adversely influence the advancement of successive increments of the mass flow into, in, and beyond the path portion 228. In other words, excessive pivoting of the beams 251 could result in a distortion of that part of the path for the mass flow which is immediately adjacent the article-contacting and carrying surfaces of the beams 251.

It is within the purview of the invention to replace the weighing device 248 with a weigher or scale which is constructed and operates in such a way that its signal generating component or components can generate signals accurately denoting the weight of successive increments of the mass flow in the path portion 228 even if those parts of such scale which are actually contacted by the rod-shaped articles do not perform any pivotal and/or other movements under the weight of successive increments of the advancing mass flow.

The second weighing device 249 is also mounted in the frame 254, and the output of its signal generating component 229a is connected to another input of the signal processing circuit 231. Thus, the circuit 231 receives two signals (from the components 229, 229a) both denoting the weight of that increment of the mass flow which happens to be located in the path portion 228.

The circuit 231 processes, preferrably sums up, the signals from the components 229, 229a of the two weighing devices 248, 249 into a signal which even more accurately denotes the weight of that increment of the mass flow which is located in the path portion 228. Such signal at the output 235 of the circuit 231 is indicative of the weight of the increment in the path portion 228 and is free of undesirable influences of forces exerted by rod-shaped articles upstream and/or downstream of the path portion 228. This is due to the fact that the beams 251 and 251a of the two weighing device 248, 249 extend in opposite directions (FIG. 7) and, therefore, the signal at the output 235 of the circuit 231 is not dependent upon the height of the mass flow. More specifically, the undesirable influence of articles which are adjacent the path portion upon the signals at the output 235 of the circuit 231 would increase with increasing height of the mass flow at the respective end of the path portion 228 if one of the weighing devices 248, 249 were omitted. However, repeated (or more accurately stated simultaneous or dual) weighing of each of a short or long series or succession of increments of the mass flow prevents the forces furnished by the articles adjacent the path portion 228 from adversely influencing the accuracy of signals which denote the weight of successive increments of the mass flow and are transmitted by the output 235 of the signal processing circuit 231. Otherwise stated, the signals at the output 235 reflect or denote the weight of successive increments of the mass flow with a highly satisfactory degree of accuracy.

In order to enable it to furnish information denoting the mass of individual articles of the mass flow advancing along its path including the path portion 228, the apparatus of FIGS. 5 to 7 is further provided with a counter (only the signal transmitting photoelectronic transducer 234 of such counter is actually shown in FIG. 5) which corresponds to the counter 32 or 132 and transmits signals to the corresponding input of the circuit 231. Signals which are supplied by the transducer 234 denote the number of rod-shaped articles which are admitted into a forming zone for the mass flow per unit of time.

Still further, an additional input of the circuit 231 receives signals from a device 257 which measures or monitors the speed of the belt conveyor 212 and hence the speed of advancement of the mass flow of rod-shaped articles along its path including the path portion 228. The signals from the transducer 234 and from the speed measuring device 257 are processed by the circuit 231 to arrive at the total numbers of rod-shaped articles in successive increments of the mass flow. This enables the output 235 of the circuit 231 to transmit a signal which is actually indicative of the average mass of individual or discrete rod-shaped articles in each of a short or long succession of weighed increments of the mass flow. Such signal can be displayed for the benefit of the attendant(s) and/or utilized to correct or alter the parameters which influence the mass of rod-shaped articles, be it tobacco-containing and/or filter material-containing articles.

It is clear that the speed of advancement of the mass flow can be ascertained (and corresponding signals transmitted to the signal processing circuit 231 or an equivalent device) in a number of ways. Thus, the illustrated device 257 measures or monitors the speed of the belt conveyor 212. In order to account for differences which develop between the measured speed of the conveyor 212 and the actual speed of the mass flow above this conveyor, the speed measuring device 257 for the conveyor 212 can be replaced by or used jointly with an optical or other suitable device which actually measures or monitors the speed of the mass flow in the apparatus of FIGS. 5 to 7.

The sensitivity and accuracy of the weighing devices 248, 249 can be influenced or adjusted or improved (and the measurements by the device 248 can be caused to match those by the device 249 and/or vice versa) by shifting the signal generating components 229, 299a in or counter to the direction of advancement of the mass flow with the conveyors 212 and 226. To this end, the frame or housing 254 is provided with longitudinally extending slots 258, 258a which permit the aforementioned longitudinal adjustments of the respective signal generating components 229, 229a. Furthermore, the frame 254 can be adjusted up or down relative to a main frame or housing 261 of the apparatus. To this end, the frame 254 is movable in the longitudinal direction of pairs of vertical or substantially vertical slots 259, 259a in the frame 261.

Still further, the apparatus of FIGS. 5 to 7 can be equipped with sets of threaded members 262 which enable the attendants to effect highly accurate precision adjustments of the frame 254 in order to locate the upper sides of the beams 251, 251a at the exact level of the upper sides of the upper reaches of the belt conveyors 212, 226 for the mass flow of rod-shaped articles.

An important advantage of the improved apparatus is its ability to continuously monitor and report the mass of rod-shaped articles which are maintained in motion during actual measurement, e.g., at the rate of speed at which they are caused to advance in a production line for plain or filter cigarettes.

Another important advantage of the improved apparatus is that it need not employ beta rays, X-rays or other types of radiation which could be dangerous to attendants and can be put to use only by resorting to complex and expensive precautionary or safety undertakings. In fact, the improved method and apparatus have been found to facilitate the monitoring of the mass of rod-shaped articles with a degree of accuracy which at least matches that of methods and apparatus relying upon X-rays, beta radiation and analogous radiation sources.

A further important advantage of the improved method and apparatus is that the apparatus can be built into or combined with existing machines or production lines which embody means for advancing mass flows of rod-shaped articles of the tobacco processing industry.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of ascertaining the mass of rod-shaped articles and, therefore, such adaptations should and are intended to be comprehended within the meaning and range of equivalence of the appended claims.

What is claimed is:

1. A method of ascertaining the mass of rod-shaped articles of the tobacco processing industry, comprising the steps of advancing a multi-layer mass flow of rod-shaped articles in a predtermined direction along a predetermined path; weighing at least twice successive increments of the mass flow in at least one predetermined portion of said path; generating a succession of signals denoting the weight of successive increments of the mass flow and the mass of articles in the respective increments, including forming a succession of at least two signals each with each succession of at least two signals denoting the weight of the respective increments; and processing said succession of said at least two signals each into processed signals denoting the combined mass of articles in the respective increments of the mass flow.

2. The method of claim 1, wherein said weighing step includes weighing successive increments of the mass flow at least twice and said signal generating step includes forming a succession of at least two signals each with each succession of at least two signals denoting the weight of the respective increments, and processing said succession of at least two signals each into processed signals denoting the combined mass of articles in the respective increments of the mass flow.

3. The method of claim 1, wherein the mass flow is subject to the action of randomly developing forces which influence the accuracy of said weighing and signal generating steps, and further comprising the step of at least reducing the influence of said forces upon at least one of said weighing and signal generating steps.

4. The method of claim 1, wherein said weighing step is carried out only upon the articles in said at least one predetermined portion of said path.

5. The method of claim 4, wherein said weighing step includes simultaneously weighing successive increments of the mass flow at least twice in said at least one predetermined portion of said path.

6. Apparatus for ascertaining the mass of rod-shaped articles of the tobacco processing industry, comprising means for advancing a multi-layer mass flow of rod-shaped articles in a predetermined direction along a predetermined path; and means for weighing successive increments of the mass flow in at least one predetermined portion of said path and for generating a succession of signals denoting the weight of successive increments and the mass of rod-shaped articles in the respective increments of the mass flow, said weighing means including a plurality of weighing devices for the articles in said at least one predetermined portion of said path and each of said weighing devices comprising means for generating signals denoting the weight of successive increments of the mass flow.

7. The apparatus of claim 6, wherein said weighing means includes at least one conveyor type weighing device forming part of said advancing means.

8. The apparatus of claim 6, further comprising means for processing signals from said plurality of weighing devices into signals denoting the mass of articles in the respective increments of the mass flow.

9. The apparatus of claim 6, wherein one of said plurality of weighing devices includes at least one first beam extending substantially in said predetermined direction and another of said plurality of weighing devices includes at least one second beam extending substantially counter to said predetermined direction.

10. The apparatus of claim 9, wherein said beams constitute carriers for successive increments of the mass flow in said at least one predetermined portion of said path.

11. The apparatus of claim 10, wherein the mass flow includes a bottom layer of rod-shaped articles and said advancing means has a surface which supports said bottom layer of articles, said one weighing device and said other weighing device defining pivot axes for the respective beams and said pivot axes extending transversely of said predetermined direction and being at least close to said surface.

12. The apparatus of claim 9, wherein said first and second beams at least partially overlap each other in said predetermined direction.

13. The apparatus of claim 12, wherein said one weighing device and said other weighing device further comprise means for supporting the respective beams in overhung positions for pivotal movement about axes extending transversely of said predetermined direction.

14. The apparatus of claim 6, further comprising means for counting the articles in said successive increments and for generating additional signals denoting the numbers of articles in the corresponding increments, and means for processing said additional signals together with the corresponding signals from said plurality of weighing devices.

15. A method of ascertaining the mass of rod-shaped articles of the tobacco processing industry, comprising the steps of advancing a multi-layer mass flow of rod-shaped articles in a predetermined direction along a predetermined path; weighing at least once successive increments of the mass flow in at least one predetermined portion of said path, said mass flow containing a predetermined number of overlying layers of rod-shaped articles, at least in said at least one predetermined portion of said path; generating a succession of signals denoting the weight of successive increments of the mass flow and the mass of articles in the respective increments; counting the numbers of articles in said successive increments of the mass flow; and processing said signals as a function of the monitored numbers of articles in the respective increments.

16. A method of ascertaining the mass of rod-shaped articles of the tobacco processing industry, comprising the steps of advancing a multi-layer mass flow of rod-shaped articles in a predetermined direction along a predetermined path at one of a plurality of speeds; weighing at least once successive increments of the mass flow in at least one predetermined portion of said path; generating a succession of first signals denoting the weight of successive increments of the mass flow and the mass of articles in the respective increments; monitoring the numbers of articles in said successive increments of the mass flow; generating first additional signals denoting the numbers of articles in the respective increments; measuring the speed of the articles in said path; generating second additional signals denoting the measured speed; and processing said first signals together with the corresponding first and second additional signals into signals denoting the average mass of articles in the respective increments of the mass flow.

17. The method of claim 16, further comprising the step of admitting rod-shaped articles into said path and said monitoring step including counting the number of rod-shaped articles admitted into said path per unit of time.

18. The method of claim 16, wherein said weighing step includes that portion of said advancing step which involves advancing successive increments of the mass flow along said at least one predetermined portion of said path.

19. The method of claim 18, wherein said weighing step further includes utilizing at least one conveyor type weighing device.

20. A method of ascertaining the mass of rod-shaped articles of the tobacco processing industry, comprising the steps of advancing a multi-layer mass flow of rod-shaped articles in a predetermined direction along a predetermined path; weighing at least once successive increments of the mass flow in at least one predetermined portion of said path, said advancing step including pushing successive increments of the mass flow in said predetermined direction along said at least one predetermined portion of said path; and generating a succession of signals denoting the weight of successive increments of the mass flow and the mass of articles in the respective increments.

21. The method of claim 20, wherein said weighing step includes employing at least one stationary weighing device for successive increments of the mass flow.

22. Apparatus for ascertaining the mass of rod-shaped articles of the tobacco processing industry, comprising means for advancing a multi-layer mass flow of rod-shaped articles in a predetermined direction along a predetermined path; and means for weighing successive increments of the mass flow in at least one predetermined portion of said path and for generating a succession of signals denoting the weight of successive increments and the mass of rod-shaped articles in the respective increments of the mass flow, said weighing means including at least one stationary weighing device for the articles in said at least one predetermined portion of said path and said advancing means comprising means for pushing rod-shaped articles of successive increments in said predetermined direction along said at least one predetermined portion of said path.

23. Apparatus for ascertaining the mass of rod-shaped articles of the tobacco processing industry, comprising means for advancing a multi-layer mass flow of rod-shaped articles in a predetermined direction along a predetermined path; means for weighing successive increments of the mass flow in at least one predetermined portion of said path and for generating a succession of first signals denoting the weight of successive increments and the mass of rod-shaped articles in the respective increments of the mass flow; means for counting the articles in said successive increments and for generating additional signals denoting the numbers of articles in the respective increments; and means for processing said first signals and the corresponding additional signals.

24. The apparatus of claim 23, further comprising means for admitting rod-shaped articles into a second portion of said path upstream of said at least one predetermined portion, said means for counting including means for counting the numbers of articles admitted into said second portion of said path per unit of time.

25. Apparatus for ascertaining the mass of rod-shaped articles of the tobacco processing industry, comprising means for advancing a multi-layer mass flow of rod-shaped articles in a predetermined direction along a predetermined path at a selected one of a plurality of different speeds; means for weighing successive increments of the mass flow in at least one predetermined portion of said path and for generating a succession of first signals denoting the weight of successive increments and the mass of rod-shaped articles in the respective increments of the mass flow; means for feeding articles into a second portion of said path upstream of said at least one predetermined portion; means for generating first additional signals denoting the numbers of articles admitted into said second portion of said path per unit of time; means for generating second additional signals denoting the selected speed of the mass flow; and means for processing said first additional signals with the second additional signals and the corresponding first signals into signals denoting the average mass of discrete articles in the respective increments of the mass flow.

26. The apparatus of claim 25, wherein said weighing means includes a plurality of weighing devices for the articles in said at least one predetermined portion of said path and each of said weighing devices comprises means for transmitting to said processing means signals denoting the weight of successive increments of the mass flow.

* * * * *